Figure 1:
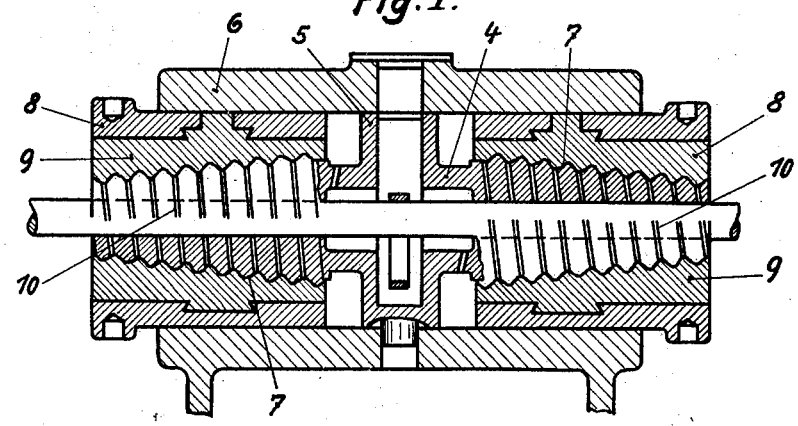

Dec. 13, 1932.    K. GOTTMANNS    1,890,604
BEARING
Filed Dec. 7, 1929

Witnesses:    Inventor:
Karl Gottmanns

Patented Dec. 13, 1932 1,890,604 of the bush is cylindrical and adapted to the bore of the housing 6. This portion is constructed as a hollow space for the oil channel, so that a lubricating ring can be accommodated in the same. In each end portion of the bush a conical screw thread 7 is cut, surrounded each by a bush 8 having a lining 9 of hard cast white-metal. The screw thread of the adjustable bronze bearing 4 has a spiral shaped narrow slit 10 extending in the thread gap to the bore corresponding to the pitch of the screw thread so that the two end portions of the bush seem to be formed of spiral bands. If the two outer bushes 8 and 9 are screwed onto these conical spiral bands, the inner bush will contract uniformly over its entire length, so that at all points a tight bearing against the circumference of the shaft is ensured.

Figure 2:
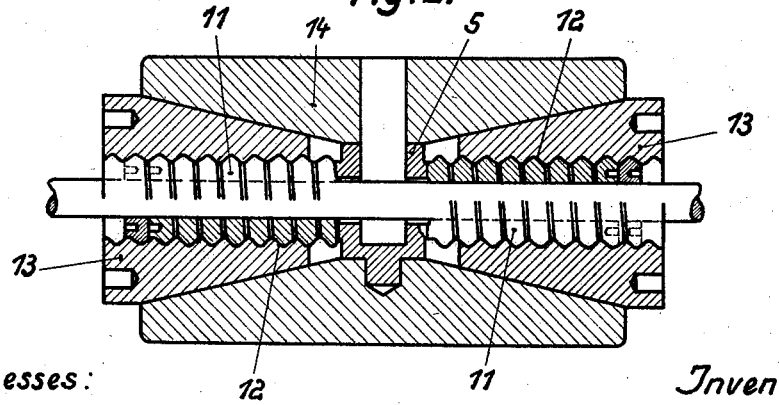

In the bearing shown in Fig. 2 the bush 11, slit in spiral shape, has cylindrical screw threads 12 on each end portion, whereas the two outer bushes 13 having corresponding internal screw threads are slit and bear with conical bearing surfaces against corresponding conical faces of the housing 14. When the outer bush 13 is being retightened the spiral shape slit portions of the bush 11 are also contracted and accordingly fitted tightly to the shaft diameter over the whole length of the bearing.

Within the range of the invention the bearings may be one sided, i. e. simply conical, care however being taken that the one end of the bush wound in spiral shape is secured either in axial direction or in the direction of the circumference.

What I claim is:

1. An adjustable bearing comprising a casing, a spiral band made up of a spirally wound bar fixed at some point with respect to said casing and having a cylindrical surface for receiving a shaft and an outer surface, a bush provided with a threaded inner surface shaped to correspond with the outer surface of said band and an outer surface shaped to correspond with the inner surface of said casing whereby rotation of said bush within the casing causes the interior diameter of the spiral band to vary uniformly over its entire length.

2. An adjustable bearing comprising a casing, a spiral band made up of a spirally wound bar fixed at some point with respect to said casing and having a cylindrical inner surface for receiving a shaft and a cylindrical outer surface, a longitudinally split bush provided with a threaded cylindrical inner surface to receive said band and a conical outer surface slidable with respect to a corresponding conical surface in said casing whereby rotation of said bush causes the interior diameter of the spiral band to vary uniformly over its entire length.

3. An adjustable bearing comprising a casing, a spiral band made up of a spirally wound bar fixed at some point with respect to said casing and having a conical outer surface, a bush provided with a threaded conical inner surface to receive said band and a cylindrical outer surface slidable with respect to said casing whereby rotation of said bush within the casing causes the interior diameter of the spiral band to vary uniformly over its entire length.

In testimony whereof I have hereunto set my hand.

KARL GOTTMANNS.